US010092055B2

(12) United States Patent
Hector, Jr. et al.

(10) Patent No.: US 10,092,055 B2
(45) Date of Patent: Oct. 9, 2018

(54) LOCAL ENERGY ABSORBER

(71) Applicant: GM GLOBAL TECHNOLOGY OPERATIONS LLC, Detroit, MI (US)

(72) Inventors: Louis G. Hector, Jr., Shelby Twonship, MI (US); Nilesh D. Mankame, Ann Arbor, MI (US); Hanif Muhammad, Ann Arbor, MI (US); Anil K. Sachdev, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 14/989,783

(22) Filed: Jan. 6, 2016

(65) Prior Publication Data

US 2017/0188650 A1 Jul. 6, 2017

(51) Int. Cl.
*A42B 3/10* (2006.01)
*B32B 15/20* (2006.01)
(Continued)

(52) U.S. Cl.
CPC ............... *A42B 3/10* (2013.01); *B32B 3/12* (2013.01); *B32B 3/266* (2013.01); *B32B 3/30* (2013.01);
(Continued)

(58) Field of Classification Search
CPC ......... A42B 3/10; A42B 3/065; B32B 15/043; B32B 15/20; B32B 3/266; B32B 3/30;
(Continued)

(56) References Cited

U.S. PATENT DOCUMENTS

| 3,820,163 A | 6/1974 | Rappleyea |
| 4,029,350 A | 6/1977 | Goupy et al. |

(Continued)

FOREIGN PATENT DOCUMENTS

| CN | 201567744 | 9/2010 |
| CN | 105752166 A | 7/2016 |

(Continued)

OTHER PUBLICATIONS

Paik, Jeom Kee, et al., "The strength characteristics of aluminum honeycomb sandwhich panels", Thin-Walled Structures 25, (1999), pp. 205-231.

(Continued)

*Primary Examiner* — Joseph Pape
*Assistant Examiner* — Dana D. Ivey
(74) *Attorney, Agent, or Firm* — Harness, Dickey & Pierce, P.L.C.

(57) ABSTRACT

A cover covering an object includes an inner surface of the cover facing the object and spaced from the object, and an outer surface of the cover opposite the inner surface. A local energy absorber is operatively attached to the inner surface of the cover. The local energy absorber includes an energy absorbing core layer operatively attached to the inner surface of the cover and a frangible face sheet layer attached to the energy absorbing core layer facing the object. The frangible face sheet layer is to initiate fracture of the frangible face sheet layer during an impact applied to the outer surface defining an impact event having a duration of less than 20 milliseconds.

22 Claims, 11 Drawing Sheets

(51) Int. Cl.
*B32B 15/09* (2006.01)
*B32B 9/04* (2006.01)
*B60R 21/34* (2011.01)
*B32B 15/04* (2006.01)
*B32B 3/26* (2006.01)
*F16F 7/00* (2006.01)
*B32B 3/12* (2006.01)
*B32B 9/00* (2006.01)
*B32B 3/30* (2006.01)
*A42B 3/06* (2006.01)

(52) U.S. Cl.
CPC .............. *B32B 9/005* (2013.01); *B32B 9/041* (2013.01); *B32B 15/043* (2013.01); *B32B 15/09* (2013.01); *B32B 15/20* (2013.01); *B60R 21/34* (2013.01); *F16F 7/003* (2013.01); *A42B 3/065* (2013.01); *B32B 2255/06* (2013.01); *B32B 2307/558* (2013.01); *B32B 2307/56* (2013.01); *B32B 2437/04* (2013.01); *B32B 2571/00* (2013.01); *B32B 2605/08* (2013.01); *B60R 2021/343* (2013.01); *F16F 2224/025* (2013.01); *F16F 2224/0208* (2013.01); *F16F 2224/0225* (2013.01); *F16F 2224/0275* (2013.01)

(58) Field of Classification Search
CPC ........... B32B 3/12; B32B 9/005; B32B 9/041; B32B 2307/558; B32B 2307/56; B32B 2437/04; B32B 2571/00; B32B 2605/08; B32B 2255/06; F16F 7/003; F16F 2224/0208; F16F 2224/0225; F16F 2224/0275; F16F 2224/025; B60R 21/34; B60R 2021/343
USPC .................................................. 296/187.03
See application file for complete search history.

(56) References Cited

U.S. PATENT DOCUMENTS

| | | | |
|---|---|---|---|
| 4,035,539 A | 7/1977 | Luboshez | |
| 4,476,820 A | 10/1984 | Nixon | |
| 4,635,981 A | 1/1987 | Friton | |
| 5,290,622 A | 3/1994 | Tanabe | |
| 5,630,645 A | 5/1997 | Lumley et al. | |
| 5,791,118 A | 8/1998 | Jordan | |
| 6,048,022 A | 4/2000 | Ishibashi et al. | |
| 6,179,364 B1 | 1/2001 | Takahashi | |
| 6,848,738 B2 * | 2/2005 | Kempf | B60R 21/34 180/69.2 |
| 6,939,599 B2 | 9/2005 | Clark | |
| 7,017,969 B1 | 3/2006 | Kirkham et al. | |
| 7,114,765 B2 | 10/2006 | Ishikawa et al. | |
| 7,140,673 B2 | 11/2006 | Ito et al. | |
| 7,147,273 B2 | 12/2006 | Ikeda et al. | |
| 7,354,101 B2 | 4/2008 | Donabedian et al. | |
| 7,399,028 B1 | 7/2008 | Castillo et al. | |
| 7,467,680 B2 | 12/2008 | Mason | |
| 7,488,031 B2 | 2/2009 | Ishitobi | |
| 7,578,548 B2 | 8/2009 | Behr et al. | |
| 7,635,157 B2 | 12/2009 | Wang et al. | |
| 7,690,720 B2 * | 4/2010 | Wang | B62D 25/12 180/69.2 |
| 7,735,908 B2 | 6/2010 | Wang et al. | |
| 7,984,943 B2 | 7/2011 | Iwano et al. | |
| 7,988,222 B2 | 8/2011 | Fujimoto | |
| 7,997,642 B2 | 8/2011 | Rocheblave et al. | |
| 8,052,198 B2 | 11/2011 | Seksaria et al. | |
| 8,356,857 B2 | 1/2013 | Ralston et al. | |
| 8,485,588 B1 | 7/2013 | Voss et al. | |
| 8,726,613 B2 | 5/2014 | Rhee et al. | |
| 8,991,902 B2 | 3/2015 | Wisniewski et al. | |
| 9,089,180 B2 | 7/2015 | Phipps et al. | |
| 9,107,466 B2 | 8/2015 | Hoying et al. | |
| 9,116,428 B1 | 8/2015 | Jacobsen et al. | |
| 9,376,074 B2 | 6/2016 | Hundley et al. | |
| 9,381,879 B2 | 7/2016 | Mankame et al. | |
| 9,718,434 B2 | 8/2017 | Hector, Jr. et al. | |
| 2008/0122261 A1 | 5/2008 | Seo | |
| 2009/0026807 A1 | 1/2009 | Wang et al. | |
| 2010/0258988 A1 | 10/2010 | Darnell et al. | |
| 2011/0070458 A1 | 3/2011 | Quan et al. | |
| 2012/0211297 A1 * | 8/2012 | Ralston | B60R 21/34 180/274 |
| 2014/0272275 A1 | 9/2014 | Yang et al. | |
| 2015/0047113 A1 | 2/2015 | Stringfellow et al. | |
| 2016/0280280 A1 | 9/2016 | Mankame et al. | |

FOREIGN PATENT DOCUMENTS

| | | |
|---|---|---|
| CN | 106945728 A | 7/2017 |
| DE | 102015119021 A1 | 5/2016 |
| DE | 102017200019 A1 | 7/2017 |
| WO | WO 2014/137924 | 9/2014 |

OTHER PUBLICATIONS

Q. Liu, Y. Xia, Q. Zhou, J.-T. Wang, "Design Analysis of a Sandwich Hood Structure for Pedestrian Protection," Paper No. 09-0356, , Proceedings of 21th International Technical Conference on the Enhanced Safety of Vehicles (ESV), Stuttgart, Germany, Jun. 15-18, 2009, 7 pages.

Kerkeling, Christoph, et al., "Structural Hood and Hinge Concepts for Pedestrian Protection", 11 pages, http://www-nrd.nhtsa.dot.gov/pdf/esv/esv19/05-0304-w.pdf.

First Office Action for Chinese Application No. 201511036185.2 dated Jul. 4, 2017 with English translation; 11 pages.

* cited by examiner

LOCAL ENERGY ABSORBER

BACKGROUND

Some automobiles and other vehicles have a hood or bonnet, which is the hinged or removable cover that allows access to the engine compartment for maintenance and repair. In many vehicles, but not all vehicles, the hood or bonnet is on the front of the vehicle, relative to the forward direction of travel.

Helmets are another type of removable cover worn by participants in many activities that may expose the helmet to an impact. For example, a helmet may be worn by a football player, a baseball player, a hockey player, a racecar driver, a motorcycle rider, an aircraft pilot, a soldier, a sailor, a firefighter, a skydiver, a spelunker, or a jockey.

SUMMARY

A cover covering a covered object includes an inner surface of the cover facing the object and spaced from the object, and an outer surface of the cover opposite the inner surface. A local energy absorber is operatively attached to the inner surface of the cover. The local energy absorber includes an energy absorbing core layer operatively attached to the inner surface of the cover and a frangible face sheet layer attached to the energy absorbing core layer facing the object. The frangible face sheet layer is to initiate fracture of the frangible face sheet layer during an impact applied to the outer surface defining an impact event having a duration of less than 20 milliseconds.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1A:
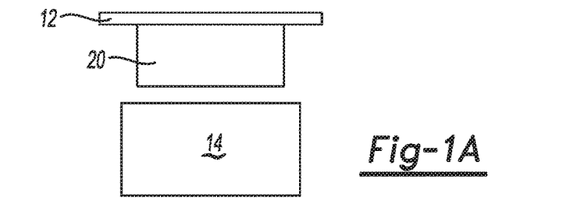
FIG. 1A is a schematic diagram of an example of a cover with a local energy absorber and a covered object according to the present disclosure.

FIG. 1A is a schematic diagram of an example of a cover 12 with a local energy absorber 20 and a covered object 14 according to the present disclosure. Examples of the cover 12 of the present disclosure removably cover a covered object 14. The cover 12 may be, for example, a vehicle hood 12', and the covered object 14 may be, for example, an underhood object 14' (see, e.g., FIG. 1B). As disclosed herein, an underhood object 14' may be, for example and without limitation, an engine, a battery, a supercharger, a sway bar, a fluid fill port cap, or combinations thereof.

Figure 17:
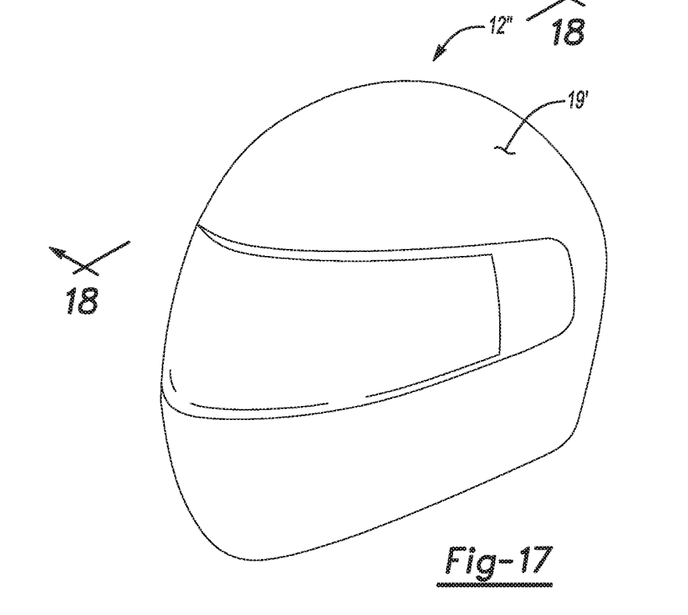
FIG. 17 is a semi-schematic, perspective view of an example of a helmet having a local energy absorber under an outer shell according to the present disclosure.
Figure 18:
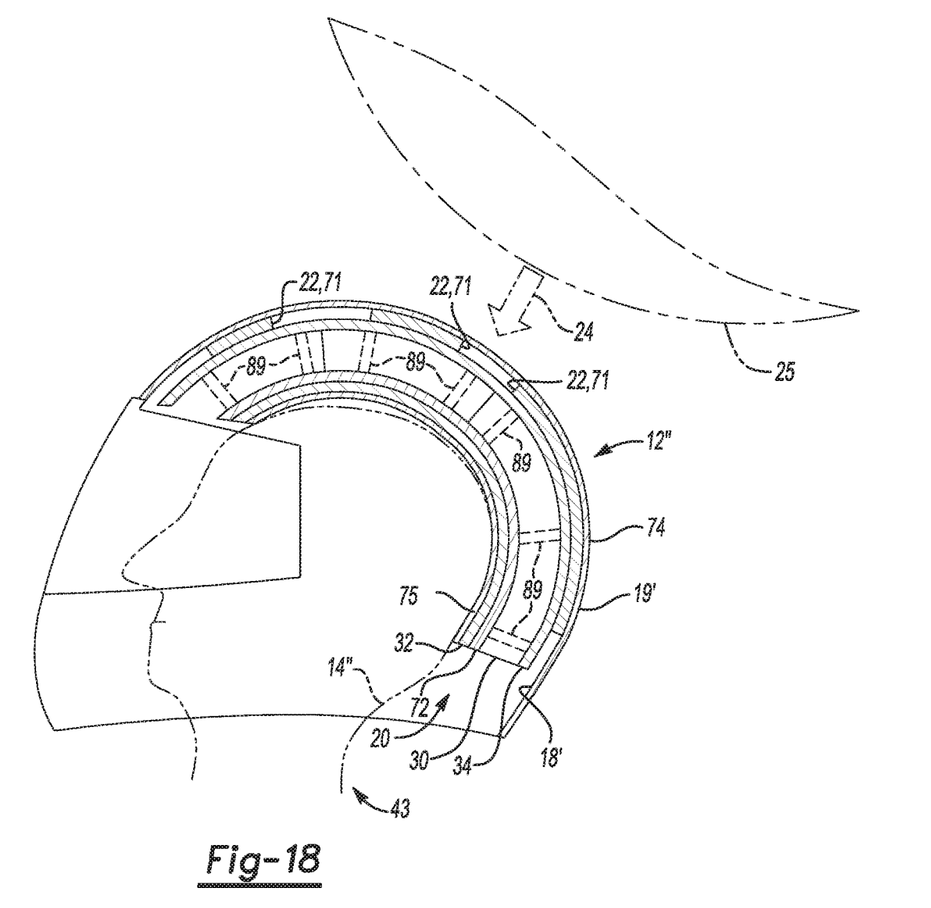
FIG. 18 is a cross-sectional view taken substantially along line 18-18 of FIG. 17.

In other examples of the present disclosure, the cover 12 may be a helmet 12", and the covered object 14 may be at least a portion of the head 14" of a wearer 43 of the helmet 12" (e.g. FIG. 17 and FIG. 18). The helmet 12" may reduce a potential effect of an impact on the head 14" of the helmet wearer 43. The helmet wearer 43 may be, for example, a football player, a baseball player, a racecar driver, a motorcycle rider, an aircraft pilot, a soldier, a sailor, a firefighter, a skydiver, a spelunker, a jockey, or participant in any activity having a helmet 12" to reduce the potential effect of impact on the head 14" of the helmet wearer 43.

Figures 1B, 2A:
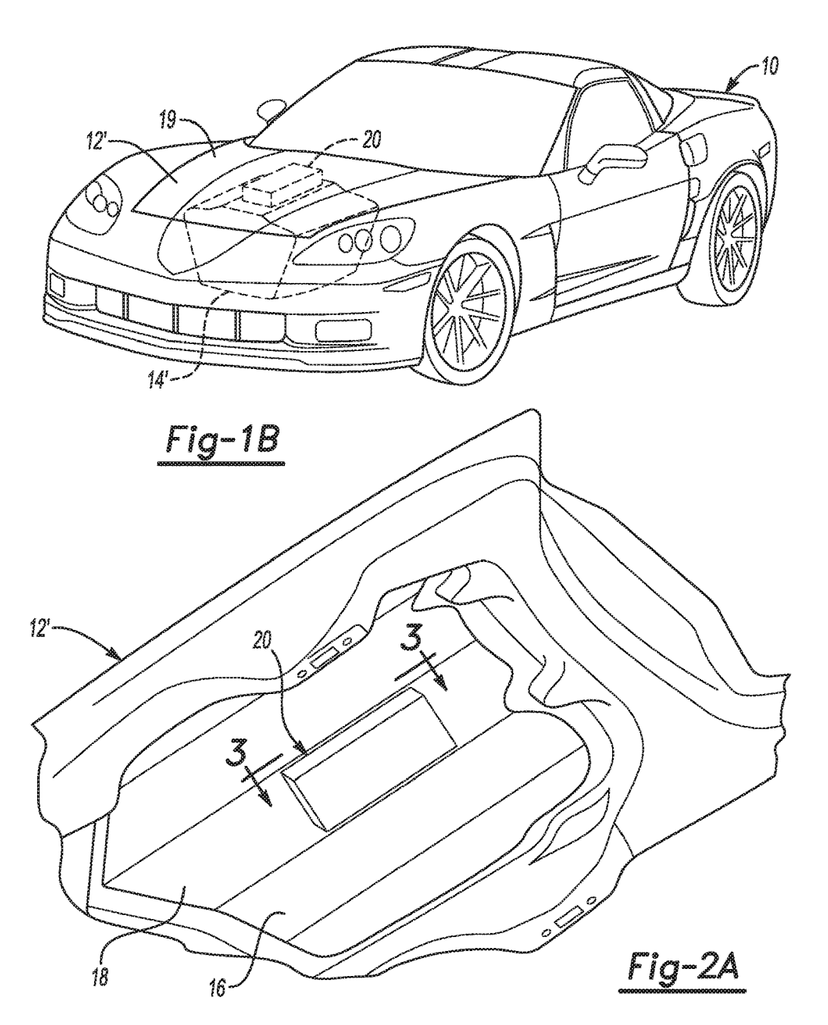
FIG. 1B is a semi-schematic, perspective view of an example of a vehicle having a local energy absorber under a hood according to an example of the present disclosure.
FIG. 2A is a semi-schematic, perspective view of the underside of the hood shown in FIG. 1B, showing an example of the local energy absorber of the present disclosure.
Figure 3:
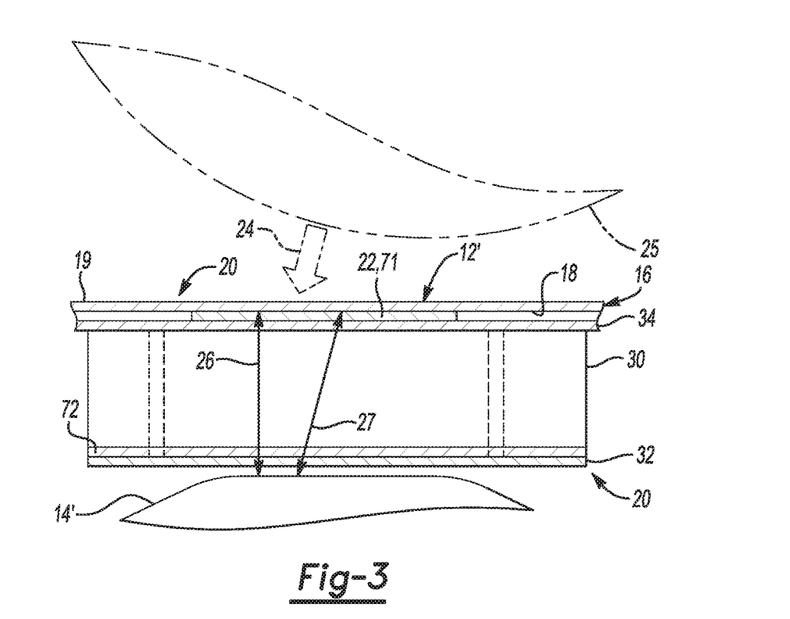
FIG. 3 is a semi-schematic, cross-sectional view taken substantially along line 3-3 of FIG. 2A.

FIG. 1B is a semi-schematic, perspective view of an example of a vehicle 10 according to the present disclosure. As used herein, "vehicle" means a self-propelled mobile machine that transports passengers or cargo. Examples of vehicles according to the present disclosure are: motor vehicles (motorcycles, cars, trucks, buses, trains), and surface watercraft (ships, boats). An underhood object 14' is shown in dashed lines. The underhood object 14' represents components within the engine compartment below the hood 12'. FIG. 2A shows the underside of the hood 12', and FIG. 3 shows a cross-sectional view taken substantially along line 3-3 of FIG. 2A. The vehicle hood 12' is generally illustrative of the forward region or the hood region of the vehicle 10. The vehicle 10 is shown for illustrative purposes and demonstrates only one possible environment into which the components described herein may be incorporated. While the present disclosure is described in detail with respect to automotive applications, those skilled in the art will recognize the broader applicability of the disclosure. Those having ordinary skill in the art will recognize that terms such as "above," "below," "upward," "downward," etc., are used descriptively of the figures, and do not represent limitations on the scope of the present disclosure. Any numerical designations, such as "first" or "second" are not intended to be limiting, and any specific component may be referenced with any number unless specifically stated herein.

As depicted in FIG. 3, the vehicle hood 12' includes a hood panel 16 having an inner surface 18 facing the underhood object 14' and an outer surface 19 opposite the inner surface 18. A local energy absorber 20 is operatively attached to the inner surface 18 of the hood panel 16 of the vehicle hood 12', such as through a bond 22. In an example, a layer of adhesive 71 may be disposed between the local energy absorber 20 and the inner surface 18 of the vehicle hood 12' to attach the local energy absorber 20 to the inner surface 18 of the vehicle hood 12' by adhesive bonding. In other examples, the local energy absorber 20 may be attached by: rivets, snap fits, or fasteners (not shown).

Figure 2B:
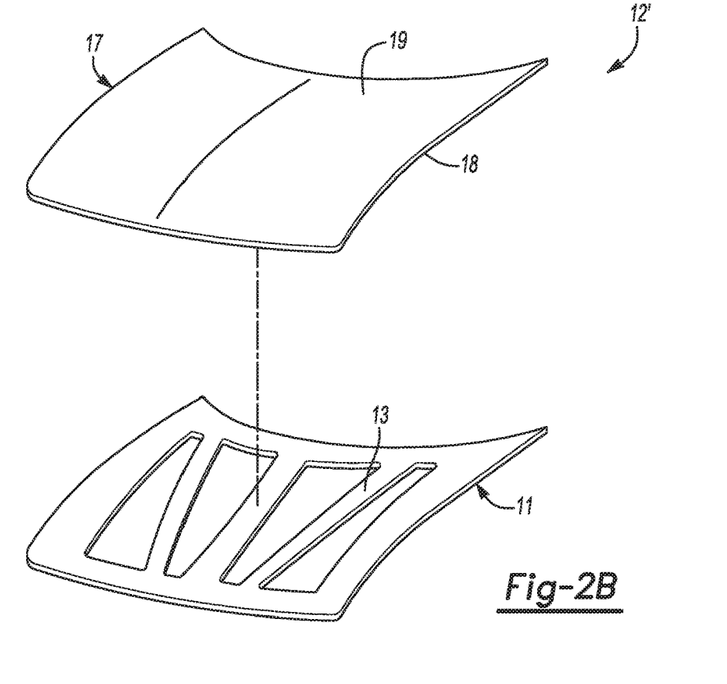
FIG. 2B is a semi-schematic, perspective exploded view of an example of a hood with a hood inner panel and a hood outer panel.

The bond 22 may be, for example and without limitation, an adhesive bond or a welded bond. The local energy absorber 20 may be attached to the inner surface 18, or disposed between the inner surface 18 and the underhood object 14' in the engine compartment of the vehicle 10. In some vehicles 10, the hood 12' may include a hood outer panel 17, and a hood inner panel 11 (see FIG. 2B). The hood outer panel 17 may have the outer surface 19, which is the surface that is visible from outside the vehicle 10 (see FIG. 1B) when the hood 12' is in a closed position as shown in FIG. 1B. The hood inner panel 11 may have a supporting rib structure 13 as depicted in FIG. 2B. In some vehicles 10, the local energy absorber 20 may be attached to the inner surface 18 indirectly. For example, the hood inner panel 11 may intervene between the local energy absorber 20 and the inner surface 18. In such an example, the local energy absorber 20 is attached to the inner surface 18 via the hood inner panel 11. In other examples, the local energy absorber 20 is confined between the hood inner panel 11 and the inner surface 18.

The local energy absorber 20 is configured to absorb energy delivered by an impact load 24 to the outer surface 19 of the hood 12', such as from an impacting object 25. In FIG. 3, the impact load 24 is represented as an arrow, and is illustrative only. The direction and type of impact may vary and the impacting object 25 causing the impact load 24 may vary.

The inner surface 18 of the hood panel 16 is spaced from the underhood object 14' by a basin depth 26. The basin depth 26 may be defined or measured in different ways. In FIG. 3, the basin depth 26 is shown as the shortest absolute distance between the inner surface 18 and the underhood object 14'. However, an alternative measurement may be made along a line substantially parallel to the expected direction of the impact load 24, which is shown as alternative basin depth 27.

If the local energy absorber 20 were not disposed between the hood panel 16 and the underhood object 14', the impact load 24 may cause the hood panel 16 to deform until the hood panel 16 crosses the basin depth 26 and makes contact with the underhood object 14'. However, the local energy absorber 20 is to begin deforming and dissipating energy from the impact load 24 before the hood panel 16 (or the hood inner panel 11) makes contact with the underhood object 14', thereby reducing the force transmitted to the impacting object 25 from the underhood object 14'. The way in which the local energy absorber 20 dissipates the impact load 24 may be quantified using Eq. 1 below. It is to be understood that Eq. 1 is an example, and not the only way to quantify the effect of the local energy absorbers of the present disclosure. For example, evaluation of helmet mounted local energy absorbers disclosed herein may include a rotational dimension (e.g., a rotational correction to the deceleration term a(t)) in addition to the linear dimension evaluated in Eq. 1. Without the local energy absorber 20, the peak loads experienced by the impacting object 25 are higher and less energy is absorbed (by the hood 12') as the impacting object 25 passes through the basin depth 26 with the hood 12' between the impacting object 25 and the underhood object 14'.

$$\left\{ (t_2 - t_1) \left[ \frac{1}{t_2 - t_1} \int_{t_1}^{t_2} a(t) dt \right]^{2.5} \right\}_{max} \qquad \text{Eq. 1}$$

In Eq. 1, $t_1$ and $t_2$ are the initial and final times (in seconds) of a time interval during which Eq. 1 attains a maximum value, and deceleration a is in units of gs (1 standard g=9.81 meters per second squared). The maximum time duration $(t_2-t_1)$ may be limited to a specific value ranging from about 3 ms to about 36 ms (milliseconds). For example, the maximum time duration may be about 20 ms.

In experimental tests, Eq. 1 is evaluated from the deceleration and time history of at least one accelerometer mounted at the center of gravity of the impacting object 25 when the impacting object 25 is impacted into the hood panel 16. Eq. 1 evaluates the effects of the deceleration on the impacting object 25 and the duration time of the deceleration. In some computer models that predict a value of Eq. 1 for an impact scenario, higher scores result from either: short impact duration times at larger maximum decelerations; or longer impact duration times at smaller maximum decelerations. For a given basin depth 26, the local energy absorber 20 of the present disclosure is to minimize or reduce the value of Eq. 1 for a particular impact scenario. Alternatively, the local energy absorber 20 may achieve a target value of Eq. 1 for a particular impact scenario while minimizing the basin depth 26.

FIGS. 1B-3 depict an example of a vehicle hood 12' of the present disclosure. The vehicle hood 12' covers an underhood object 14'. The vehicle hood 12' has an inner surface 18 facing the underhood object 14' and spaced from the underhood object 14'. The vehicle hood 12' has an outer surface 19 opposite the inner surface 18. A local energy absorber 20 is operatively attached to the inner surface 18 of the vehicle hood 12'. The local energy absorber 20 includes an energy absorbing core layer 30 operatively attached to the inner surface 18 of the vehicle hood 12'.

Figure 4:
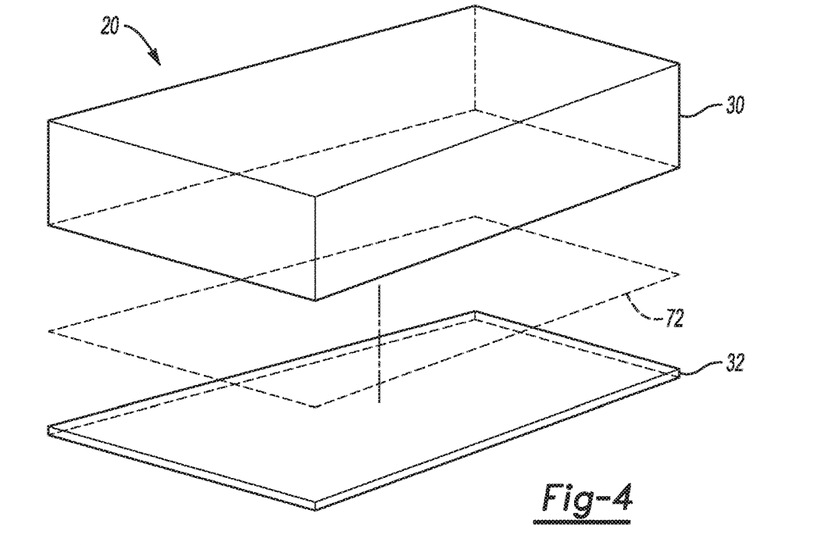
FIG. 4 is a semi-schematic, perspective exploded view of an example of a local energy absorber according to the present disclosure.

As depicted in FIG. 4, a frangible face sheet layer 32 is attached to the energy absorbing core layer 30 facing the underhood object 14'. In an example, the local energy absorber 20 may have an adhesive layer 72 disposed between the energy absorbing core layer 30 and the frangible face sheet layer 32 to attach the frangible face sheet layer 32 to the energy absorbing core layer 30 by adhesive bonding. In FIG. 4, the adhesive layer 72 is shown in hidden line because the adhesive layer 72 may or may not be included in examples of the local energy absorber 20. In an example, the frangible face sheet layer 32 may include a magnesium alloy sheet, for example, formed from Magnesium AZ31-O. The frangible face sheet layer 32 is to initiate fracture of the frangible face sheet layer 32 during an impact applied to the outer surface 19 defining an impact event having a duration of less than 20 milliseconds.

In an example, the local energy absorber 20 is to contact the underhood object 14' during the impact event. The frangible face sheet layer 32 may be to dissipate energy by bending and fracturing during the contact with the underhood object 14'.

As used herein, frangible means prone to cracking, rather than able to deform elastically to retain cohesion as a single object. A chicken egg shell may be described as frangible, while a golf ball cover, which deforms elastically, is not frangible. Frangible means prone to becoming a multiply connected body by development of internal surfaces during crack development, even if there are no pre-existing through thickness notches, at low plastic or even at elastic strain levels. A chick is able to hatch by applying relatively low force to the frangible egg shell. In sharp contrast, a golf ball may resist cutting and cracking even after being hit with the edge of a club head swung at high speed. Therefore, the frangible face sheet layer 32 cracks and may break into pieces upon impact rather than elastically or plastically deforming like a piece of steel sheet metal. Thus, the energy absorber 20 with the frangible face sheet layer 32 as disclosed herein is an improvement over existing energy absorbers that undergo substantial elastic/plastic compression such that energy absorption diminishes as the impact load increases with time.

Figure 5A:
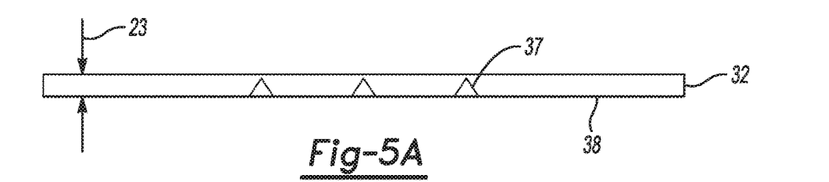
FIG. 5A is a semi schematic cross-sectional side view of an example of a frangible face sheet layer with stress concentrating notches according to the present disclosure.
Figure 5B:
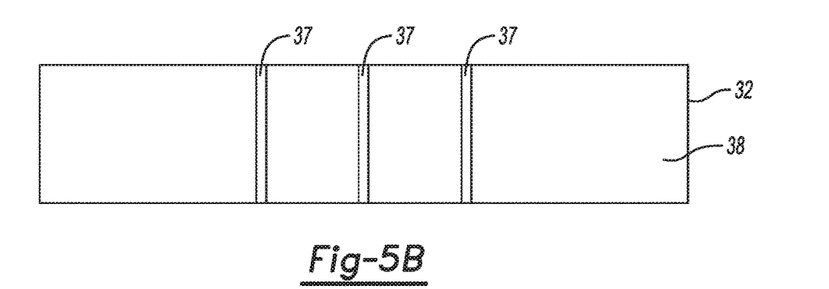
FIG. 5B is a bottom view of the example of the frangible face sheet layer depicted in FIG. 5A.

As depicted in FIGS. 5A and 5B, frangible face sheet layer 32 may define at least one stress concentrating notch 37 in a surface 38 of the frangible face sheet layer 32. The at least one stress concentrating notch 37 is to initiate fracture of the frangible face sheet layer 32 during the impact event. As depicted in FIGS. 5A and 5B, the at least one stress concentrating notch 37 refers to 3 stress concentrating notches 37. It is to be understood that the stress concentrating notches 37 are shown schematically, and may appear to be more like scratches than the deep notches shown in FIG. 5B. As an example, a glass cutter makes a relatively small scratch to cause a fracture to be located at the scratch when stress is applied to a plate of glass by lightly tapping with a hammer or applying bending stress across the scratch. The small scratch in the plate glass is an example of a stress concentrating notch 37 in a frangible material.

Figure 5C:
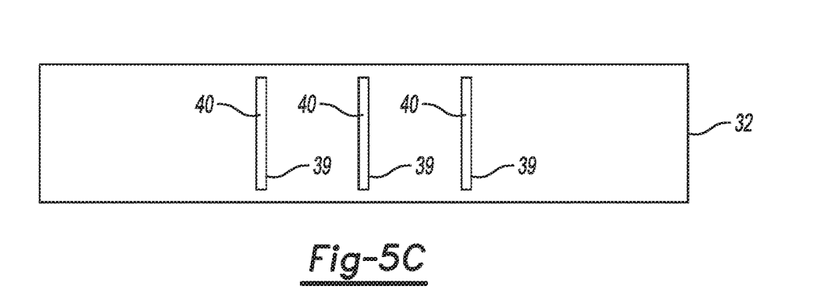
FIG. 5C is a top view of an example of a frangible face sheet layer with slots to initiate fracture of the frangible face sheet layer during impact according to the present disclosure.

The example depicted in FIG. 5C is similar to the examples depicted in FIGS. 5A and 5B except instead of having a notch 37 that does not completely penetrate the frangible face sheet layer 32, the frangible face sheet layer 32 defines a perimeter 39 of at least one slot 40 completely through a thickness 23 of the frangible face sheet layer 32. The at least one slot 40 is to be a fracture initiation site on the frangible face sheet layer 32 during the impact event.

It is to be understood that in examples of the present disclosure, the frangible face sheet layer 32 may fracture on impact. The notch 37 promotes the fracture, while the initiation of fracture occurs as the result of impact. Therefore, the frangible face sheet layer 32 does not tend to fracture until the impact event.

Figure 6:
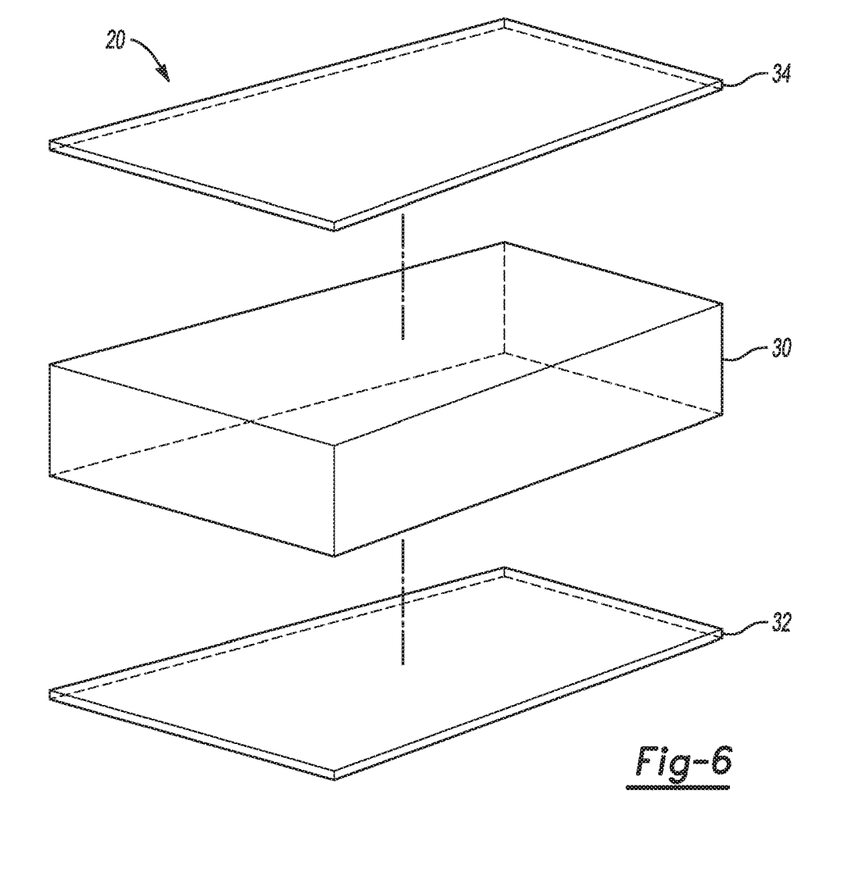
FIG. 6 is a semi-schematic, perspective exploded view of an example of a local energy absorber with a reinforcement sheet layer attached to the energy absorbing core layer according to the present disclosure.

In the example depicted in FIG. 6, the local energy absorber 20 includes a reinforcement sheet layer 34 attached to the energy absorbing core layer 30 opposite to the frangible face sheet layer 32 to sandwich the energy absorbing core layer 30 between the frangible face sheet layer 32 and the reinforcement sheet layer 34. An adhesive layer (not shown) may be included between the energy absorbing core layer 30 and the frangible face sheet layer 32. Another adhesive layer (not shown) may be included between the energy absorbing core layer 30 and the reinforcement sheet layer 34.

Figure 7A:
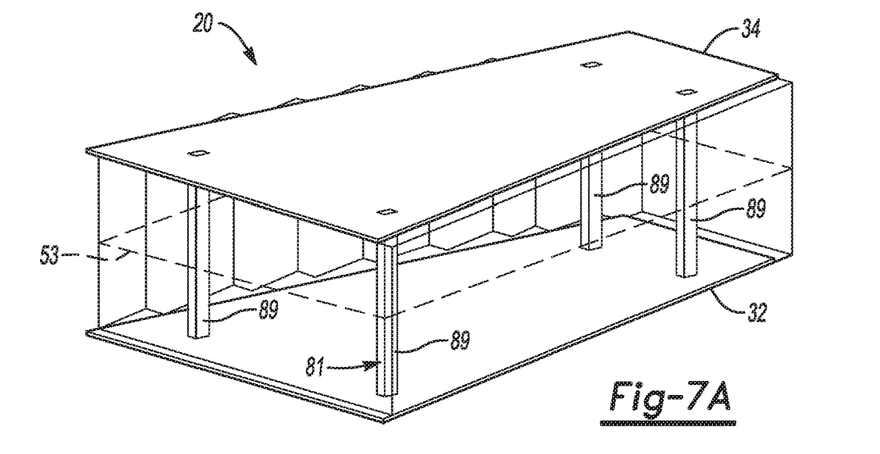
FIG. 7A is a semi-schematic, perspective view of an example of a local energy absorber with a reinforcement sheet layer attached to the energy absorbing core layer and a plurality of struts, each strut attached to the reinforcement sheet layer and to the frangible face sheet layer according to the present disclosure.
Figure 7B:
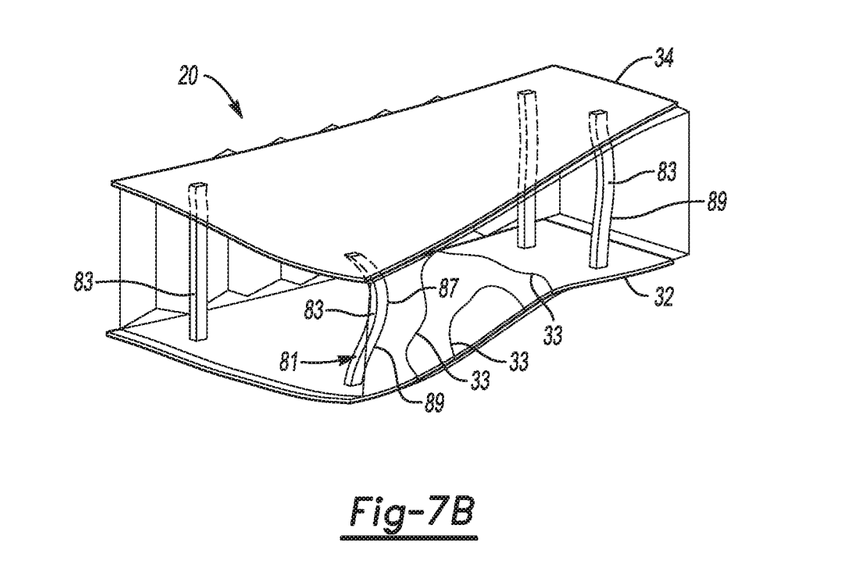
FIG. 7B is a semi-schematic, perspective view of the example of the local energy absorber depicted in FIG. 7A showing deformation of the local energy absorber during an impact event according to the present disclosure.
Figure 7C:
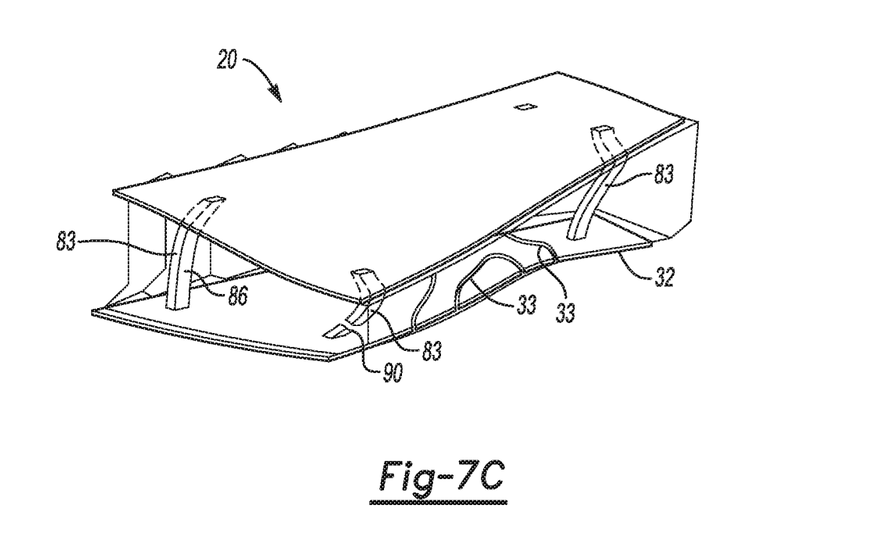
FIG. 7C is a semi-schematic, perspective view of the example of the local energy absorber depicted in FIG. 7A showing further deformation of the local energy absorber beyond the deformation depicted in FIG. 7B according to the present disclosure.

FIGS. 7A-7C depict an example of the local energy absorber 20 of the present disclosure as the local energy absorber 20 is transformed during an impact event. The local energy absorber 20 in FIGS. 7A-7C includes a plurality 81 of struts 89. Each strut 89 is attached to the reinforcement sheet layer 34 and to the frangible face sheet layer 32. Each strut 89 of the plurality 81 of struts 89 is spaced inwardly from a perimeter 53 of the local energy absorber 20.

A subset 83 of the plurality 81 of struts 89 is to, during the impact event, deform in a sequence beginning with elastic deformation (reference numeral 86), followed by buckling (reference numeral 87), followed by fracture (reference numeral 90) of the subset 83 of the plurality 81 of struts 89. In examples of the present disclosure, there may be plastic deformation prior to or coincident with the buckling. It is to be understood that the local energy absorber 20 may be able to withstand, without permanent deformation, incidental contact that is less energetic than the impact event. For example, contact from components of a normally operating automatic car wash on the vehicle hood 12' would not cause buckling or fracture of elements of the local energy absorber 20. Similarly, a local energy absorber 20 included in a helmet 12" would withstand a certain level of collision without permanent deformation; yet buckle and fracture as described herein when subjected to an impact event as disclosed herein.

Figure 8A:
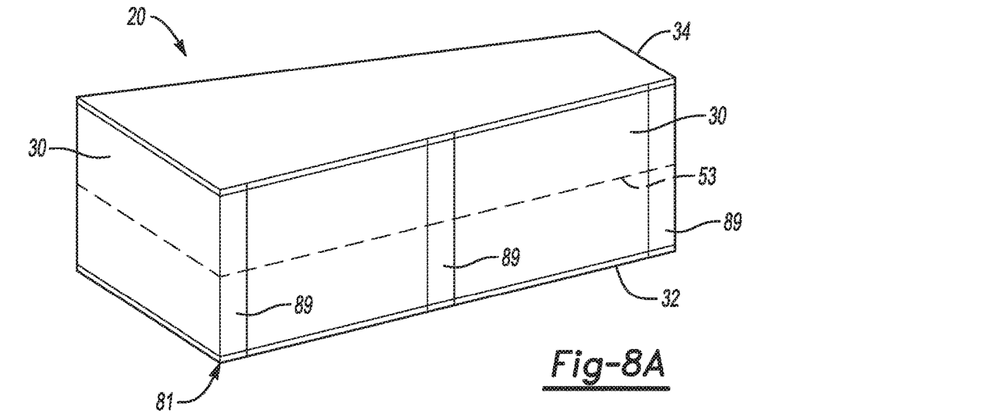
FIG. 8A is a semi-schematic, perspective view of an example of a local energy absorber having each of a plurality of struts located at a perimeter of the local energy absorber according to the present disclosure.
Figure 8B:
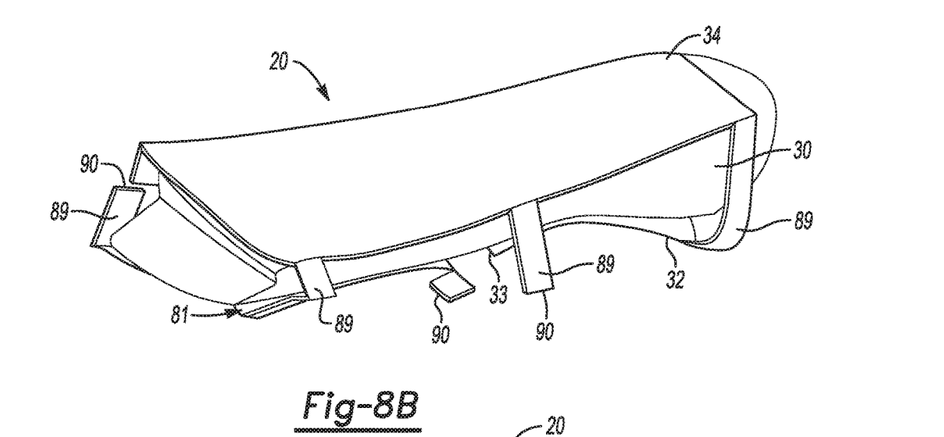
FIG. 8B is a semi-schematic, perspective view of the example of the local energy absorber depicted in FIG. 8A showing deformation of the local energy absorber after an impact event according to the present disclosure.

In the example depicted in FIGS. 8A and 8B, each strut 89 of the plurality 81 of struts 89 is located at a perimeter 53 of the local energy absorber 20. FIG. 8A depicts an example of the local energy absorber 20 prior to the impact event, and FIG. 8B depicts the example of the local energy absorber 20 depicted in FIG. 8A after the impact event. In FIG. 8B, the struts 89 are buckled and fractured. Fractures in the struts 89 are indicated at reference numeral 90. The frangible face sheet layer 32 is shown fractured at reference numeral 33 in FIG. 8B.

Figure 9:
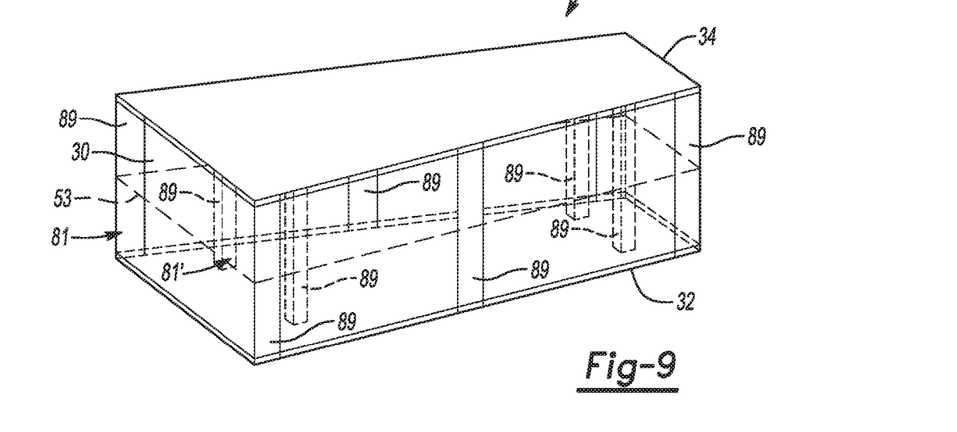
FIG. 9 is a semi-schematic, perspective view of an example of a local energy absorber having a plurality of struts located at a perimeter of the local energy absorber and another plurality of struts spaced from the perimeter of the local energy absorber according to the present disclosure.

FIG. 9 is a semi-schematic, perspective view of an example of a local energy absorber 20 having a plurality 81 of struts 89 located at a perimeter 53 of the local energy absorber 20 and another plurality 81' of struts 89 spaced inwardly from the perimeter 53 of the local energy absorber 20 according to the present disclosure. The energy absorbing core layer 30 may have complementary spaces (not shown) to allow the struts 89 to reach from the frangible face sheet layer 32 to the reinforcement sheet layer 34 through the energy absorbing core layer 30.

Figure 10:
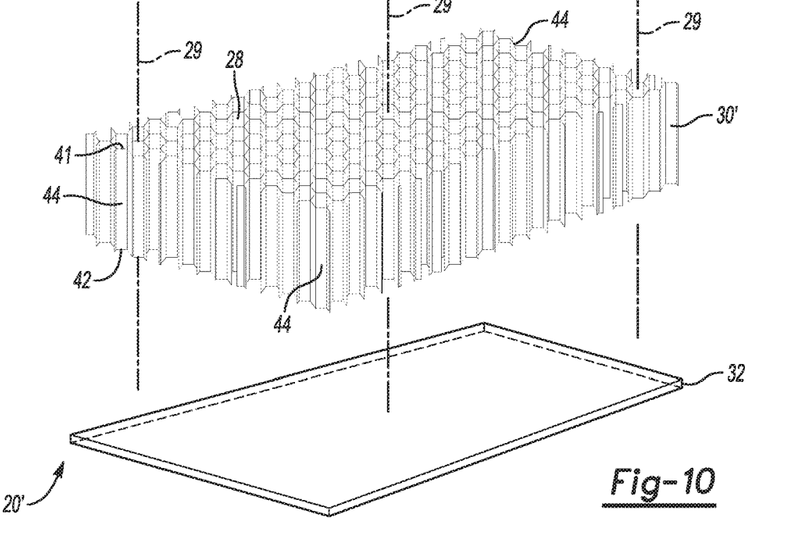
FIG. 10 is a semi-schematic, perspective exploded view of the example of the local energy absorber depicted in FIG. 4 having a honeycomb energy absorbing core layer according to the present disclosure.

FIG. 10 is a semi-schematic, perspective exploded view of an example of the local energy absorber 20'. The local energy absorber 20' depicted in FIG. 10 is a more specific example of the local energy absorber 20 depicted in FIG. 4 with a honeycomb energy absorbing core layer 30' according to the present disclosure. More generally, FIG. 10 semi-schematically represents an example of a local energy absorber 20' with the energy absorbing core layer 30' including a matrix of open cells 44. Each cell 44 in the matrix of open cells 44 defines a respective hollow tube 28 having a respective longitudinal axis 29 with a respective first open end 41 and a respective second open end 42. Each respective longitudinal axis 29 is perpendicular to the frangible face sheet layer 32. Although the open cells 44 depicted in FIG. 10 are hexagonal, the present disclosure includes cells with any number of sides, including a single side—which would be a circular cylinder. For example, the open cells 44 may be triangular tubes, rectangular tubes, pentagonal tubes, hexagonal tubes, or tubes having a cross-section defined by any polygon. The sides of the tubes need not be of equal size. Further, the tubes do not necessarily nest perfectly with one another. There may be gaps between the tubes that form another tube.

Figure 11:
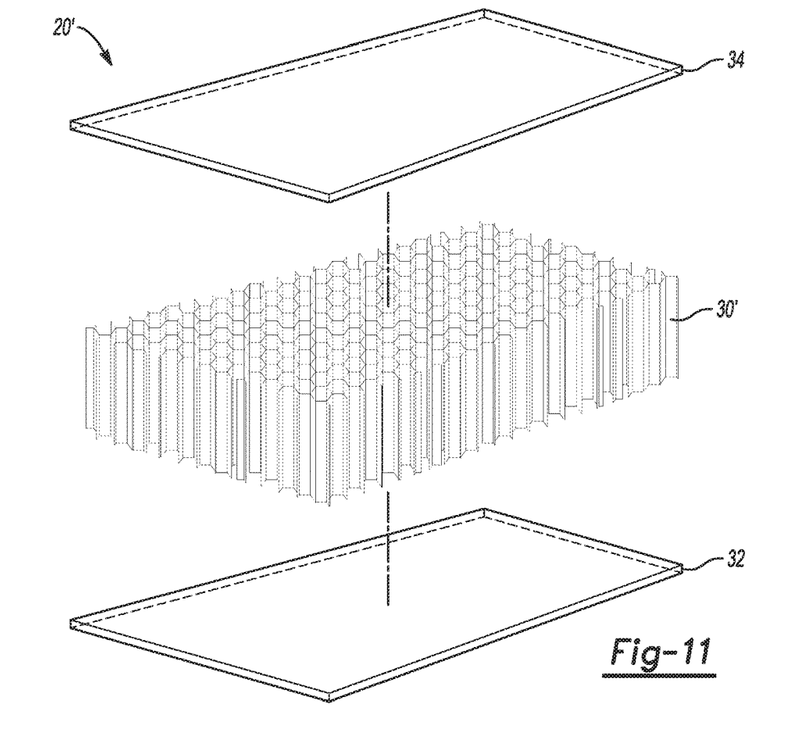
FIG. 11 is a semi-schematic, perspective exploded view of the example of the local energy absorber depicted in FIG. 6 having a honeycomb energy absorbing core layer according to the present disclosure.

FIG. 11 is a semi-schematic, perspective exploded view of an example of the local energy absorber 20'. The local energy absorber 20' depicted in FIG. 11 is a more specific example of the local energy absorber 20 depicted in FIG. 6 with a honeycomb energy absorbing core layer 30' according to the present disclosure.

Figure 12:
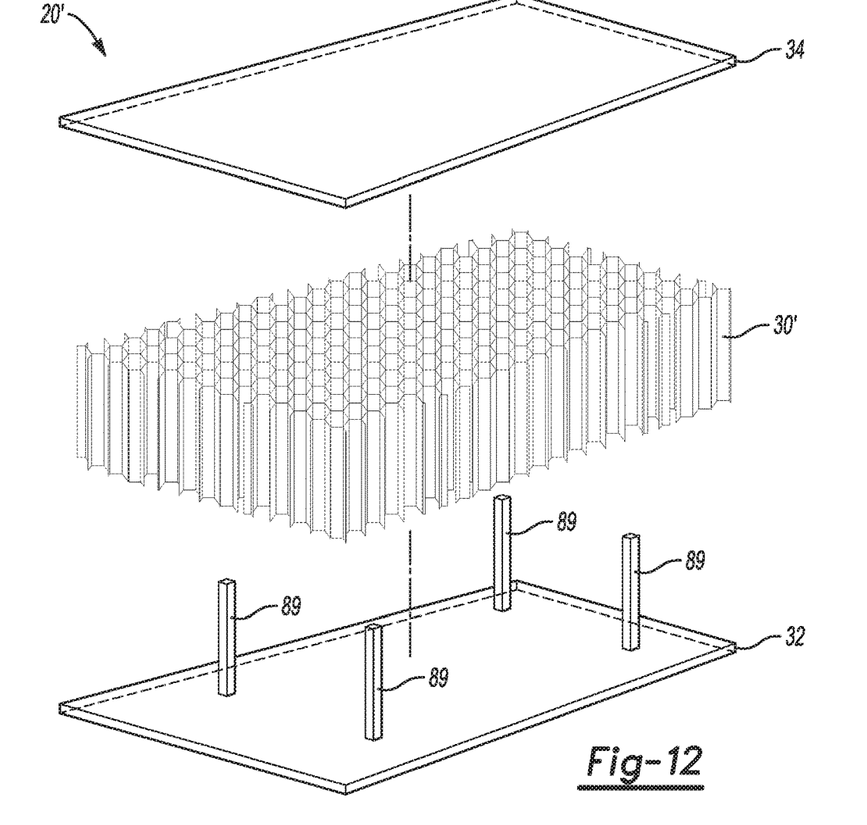
FIG. 12 is a semi-schematic, perspective exploded view of the example of the local energy absorber depicted in FIG. 7A having a honeycomb energy absorbing core layer.

FIG. 12 is a semi-schematic, perspective exploded view of an example of the local energy absorber 20'. The local energy absorber 20' depicted in FIG. 12 is a more specific example of the local energy absorber 20 depicted in FIG. 7A having a honeycomb energy absorbing core layer 30' according to the present disclosure. In a non-limiting example, the energy absorbing core layer 30' may include a 3003 aluminum alloy with a crush strength of about 45 pounds per square inch (psi). The energy absorbing core layer 30' may have other honeycomb materials such as aramid fiber, thermoplastic, fiberglass, ceramic, magnesium, titanium, nickel, stainless steel, copper, or combinations thereof. Each strut 89 in the plurality of struts may be formed from Magnesium AZ31-O. Each strut 89 in the plurality of struts may be formed from other materials such as aluminum alloys, various plastics, or composites like carbon fiber composite. Each strut 89 is formed from a material that buckles and fractures or buckles, plastically deforms and then fractures. The frangible face sheet layer 32 may include a first Magnesium AZ31-O sheet. The frangible face sheet layer 32 may have other materials such as a thin glass sheet, carbon fiber or other low fracture toughness composite, ceramics or combinations thereof. The reinforcement sheet layer 34 may be formed from a polymer or another material such as Magnesium AZ61, AZ91 or ZEK100; aluminum alloys, composites or combinations thereof.

Figure 13:
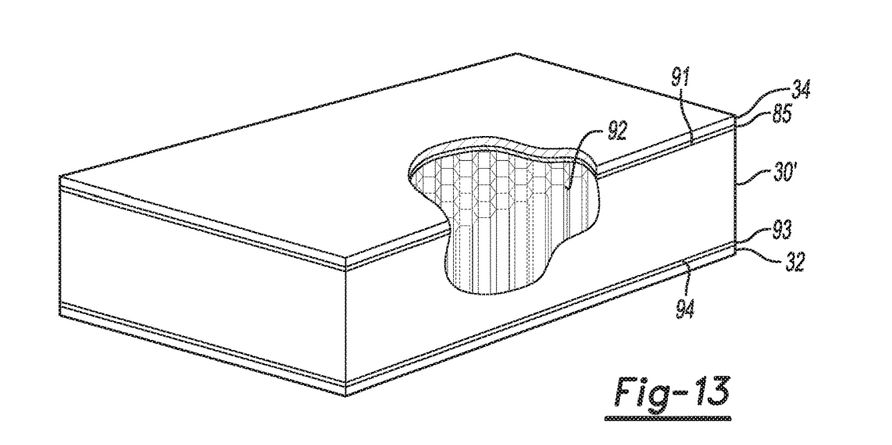
FIG. 13 is a semi-schematic, perspective cutaway view of an example of a local energy absorber.

Referring to FIG. 13, in examples of the present disclosure, the energy absorbing core layer 30' may include an aluminum alloy honeycomb 92. A reinforcement sheet seal 85 is formed at a reinforcement interface 91 between the reinforcement sheet layer 34 and the aluminum alloy honeycomb 92. A face sheet seal 93 is formed at a face sheet interface 94 between the frangible face sheet layer 32 and the aluminum alloy honeycomb 92 to prevent water or other contaminants like dirt, motor oil, etc. from entering the aluminum alloy honeycomb 92. The aluminum alloy honeycomb 92 may have a liquid, a gas, or a combination of a liquid and gas charged into the cells of the aluminum alloy honeycomb 92 to alter the energy absorbing performance of the aluminum alloy honeycomb 92. For example, a pressurized gas charged in the aluminum alloy honeycomb 92 may provide initial stiffness to the aluminum alloy honeycomb 92. The stiffness of the aluminum alloy honeycomb 92 may be reduced as the frangible face sheet layer 32 fractures and releases the pressurized gas from the cells of the aluminum alloy honeycomb 92. By sealing the aluminum alloy honeycomb 92 from the entry of water and debris, the seals 85, 93 provide more consistent energy absorbing performance over time. For example, water, ice, snow, and dust may accumulate in an unsealed honeycomb (not shown) and stiffen the energy absorbing core layer 30' that includes an aluminum alloy honeycomb 92.

Figure 14:
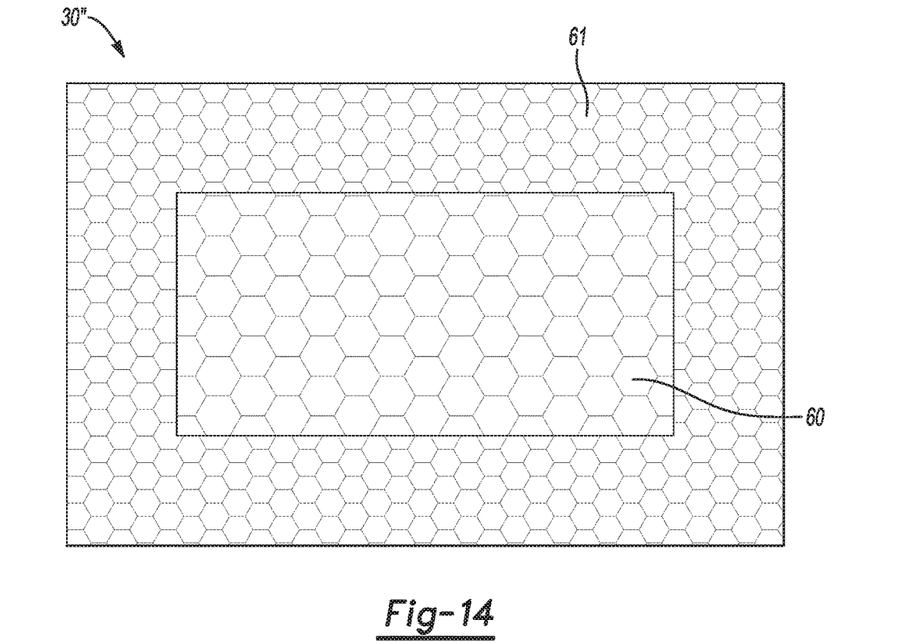
FIG. 14 depicts a semi-schematic top view of an example of an energy absorbing core layer according to the present disclosure.

FIG. 14 depicts a semi-schematic top view of an example of an energy absorbing core layer 30". The energy absorbing core layer 30" may include a first core portion 60 having a first crush strength, and a second core portion 61 having a second crush strength at least 10 percent greater than the first crush strength. The first core portion 60 may be attached to the frangible face sheet layer 32 similarly to the attachment of the energy absorbing core layer 30' shown in FIG. 13. The second core portion 61 may also be attached to the frangible face sheet layer 32 similarly to the attachment of the energy absorbing core layer 30' shown in FIG. 13. The first core portion 60 may be adjacent to the second core portion 61.

Figure 15:
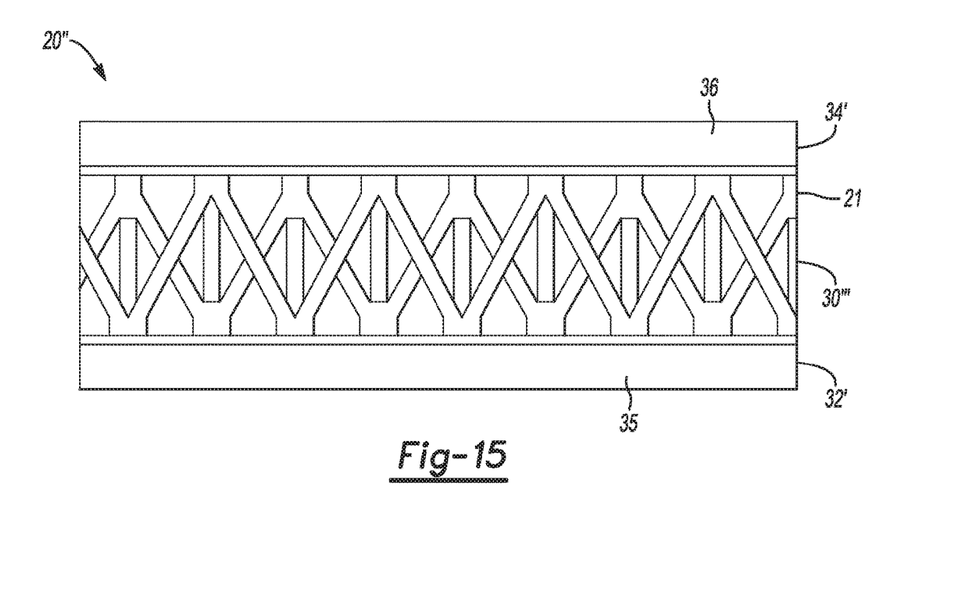
FIG. 15 is a semi-schematic, side view of another example of a local energy absorber according to the present disclosure.

FIG. 15 depicts a semi-schematic, side view of another example of a local energy absorber 20'''. In the example depicted in FIG. 15, the energy absorbing core layer 30''' includes a lattice material layer 21. In examples, the lattice material layer 21 may include a polymeric microtruss as depicted in FIG. 15. In other examples the lattice material layer may be formed from a metal, ceramic or composite. The frangible face sheet layer 32' may include a first sheet 35 made from polyethylene terephthalate (PET), a metal (e.g. a magnesium alloy), a first ceramic material, or other frangible material. The reinforcement sheet layer 34' may include a second sheet 36 made from polyethylene terephthalate (PET), a metal (e.g. a magnesium alloy), a second ceramic material, or other suitable material. The first ceramic material may be the same or different material compared to the second ceramic material. For example, the reinforcement sheet layer 34' may be made from a light weight material that is easy to bond adhesively. In some examples, the reinforcement sheet layer 34' may be an electrical insulator.

An example of the local energy absorber 20 is shown and described herein on the vehicle hood 12'. However, the local energy absorber 20 may also be used to reduce the potential effects of impacts to objects impacting other exterior panels or portions of the vehicle 10. For example, and without limitation, the local energy absorber 20 may be located adjacent to: fenders, bumpers, or quarter panels. The local energy absorber 20 may also be used in a helmet 12" (see FIG. 17) to reduce a potential effect of an impact on the head 14" of a helmet wearer 43. Under sufficient impact load 24, the hood panel 16 or outer shell 74 deforms, and the local energy absorber 20 moves from the position shown in FIG. 3 toward the underhood object 14' or the head 14" of the helmet wearer 43. After the frangible face sheet layer 32 impacts the underhood object 14', the local energy absorber 20 deforms and absorbs some of the energy of the impact load 24.

FIGS. 7A, 7B, and 7C depict an example of an energy absorber in an impact from an impacting object as shown in FIG. 3. Prior to fracturing, the local energy absorber 20 may absorb some of the energy from impact. Upon fracturing, the local energy absorber dissipates energy from the impact load 24 by opening up new surfaces in a subset 83 of the plurality of struts 81. The accumulation of excess strain energy within the absorber causes a crack to open after initial impact, which then dissipates strain energy into fracture propagation. The energy dissipated during fracture further prevents or minimizes a reaction force exerted by the underhood object 14' upon the impacting object 25. The fractures 90 may occur along a strut 89 (see FIG. 7C and FIG. 8B) such that much of the energy dissipated by the local energy absorber 20 is dissipated by the strut 89. Fractures 33 may also occur in the frangible face sheet layer 32.

The local energy absorber 20 shown in FIGS. 1-3, is shown as a metallic material, such as aluminum, magnesium, or alloys thereof. However, the local energy absorber 20 may be formed from other materials, as described herein. For example, the local energy absorber 20 may be formed from a high-temperature polymer. As used herein, a high temperature polymer maintains its properties at temperatures above 150° C. up to 200° C. Examples of high-temperature polymers are polyamides (e.g. Nylon®), polyphenylene sulfide (PPS) and polyethersulfone (PES).

In some configurations of the local energy absorber 20, the plurality of struts 81 moves from elastic deformation into fracture deformation substantially without plastic deformation. This may reduce the value determined using Eq. 1 resulting from the impact load 24 delivered by the impacting object 25. If the local energy absorber 20 is formed from magnesium or magnesium alloys, the frangible face sheet layer 32 and the reinforcement sheet layer 34 may move more directly between elastic and fracture deformation than if the local energy absorber 20 is formed from aluminum. Magnesium alloys may experience very little plastic deformation between elastic deformation and fracture, but usually will experience some plastic deformation.

Figure 16:
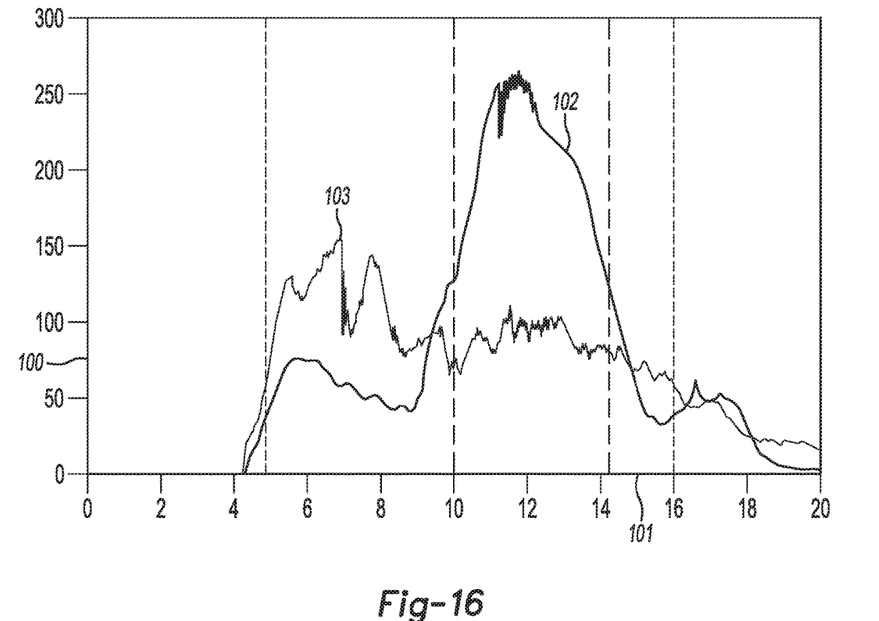
FIG. 16 is a deceleration vs. time chart of an impact of an impacting object into a vehicle hood including a local energy absorber according to the present disclosure compared with a similar impact into a hood without the local energy absorber.

FIG. 16 is a deceleration vs. time chart of an impact of an impacting object 25 into a vehicle hood including a local energy absorber according to the present disclosure compared with a similar impact into a hood without the local energy absorber. In FIG. 16, the horizontal axis 101 indicates time in milliseconds (ms), and the vertical axis 100 indicates deceleration in units of g. Without being bound to any theory, it is believed that examples of the energy absorber 20 disclosed herein allow the impact energy to be absorbed while reducing the maximum deceleration experienced by the impacting object 25. Since the energy absorbed is directly related to the deceleration integrated over time (the area under the deceleration curve in Eq. 1), the existing energy absorber depicted by trace 102, which begins plastic deformation at about 5.5 ms, does not absorb sufficient energy early enough in the impact to prevent the deceleration from climbing to the peak at about 12 ms. It is believed that without the energy absorber, the hood bottoms out (i.e. contacts the underhood object 14') at about 9 ms, causing the rise in deceleration as the impacting object 25 begins to elastically deform under load of the impact. The underhood object 14' is relatively stiff, producing the steep deceleration curve with respect to time as depicted in trace 102. In sharp contrast, the local energy absorber 20 of the present disclosure depicted in trace 103 absorbs energy early in the progression of the impact event, (up to about 5.5 ms), which is earlier than in trace 102. At about 5.5 ms, fracturing of the frangible face sheet layer 32 begins. Fracturing dissipates energy from the impact. Energy continues to be absorbed by the local energy absorber 20 due to elastic and/or plastic deformation in the energy absorbing layer as well as due to elastic and/or plastic deformation and fracture in the struts and the frangible sheet. Progressive collapse of a number of struts also serves to distribute the energy absorption and dissipation over a wider time interval thereby reducing the peak deceleration. The deceleration during this phase is lower than the early portion of the trace 103 where the struts were elastically reacting the impact load. As a result, the peak deceleration in trace 103 associated with the local energy absorber 20 of the present disclosure is lower than the peak deceleration of the trace 102 associated with the hood without the local energy absorber 20. Also, the peak deceleration in trace 103 associated with the local energy absorber 20 of the present disclosure occurs at an earlier time in the impact relative to the deceleration trace 102.

FIGS. 17 and 18 depict an example of the present disclosure with the cover 12 being a helmet 12". The head 14" of the helmet wearer 43 is shown in phantom lines. FIG. 18 shows a cross-sectional view taken substantially along line 18-18 of FIG. 17. As depicted in FIG. 17, the helmet 12" includes an outer shell 74 having an inner surface 18' facing the head 14" and an outer surface 19' opposite the inner surface 18'. A local energy absorber 20 is operatively attached to the inner surface 18' of the outer shell 74 of the helmet 12", such as through a bond 22. In an example, a layer of adhesive 71 may be disposed between the local energy absorber 20 and the inner surface 18' of the helmet 12" to attach the local energy absorber 20 to the inner surface 18' of the helmet 12" by adhesive bonding. In other examples, the local energy absorber 20 may be attached by snap fits, or fasteners (not shown).

The bond 22 may be, for example and without limitation, an adhesive bond or a welded bond. The local energy absorber 20 may be attached to the inner surface 18', or disposed between the inner surface 18' and the head 14" of the helmet wearer 43. In some examples of the present disclosure, the helmet 12" may include the outer shell 74, and a helmet liner 75. The outer shell 74 may have an outer surface 19', which is the surface that is visible from outside the helmet 12". The helmet liner 75 may be constructed of a tough, yet flexible material, for example Kevlar® fabric. In another example, the helmet liner 75 may be a layer of aluminum. In examples, the local energy absorber 20 may be confined between the helmet liner 75 and the inner surface 18'.

The local energy absorber 20 is configured to absorb energy delivered by an impact load 24 to the outer surface 19' of the helmet 12", such as from an impacting object 25. The impact load 24 is represented as an arrow, and is illustrative only. The direction and type of impact may vary and the impacting object 25 causing the impact load 24 may vary.

If the local energy absorber 20 were not disposed between the outer shell 74 and the head 14", the impact load 24 may cause the outer shell 74 to deform until the outer shell 74 makes contact with the head 14". However, the local energy absorber 20 is to begin deforming and dissipating energy from the impact load 24 before the outer shell 74 makes contact with the head 14", thereby reducing the force applied by impact. The way in which the local energy absorber 20 dissipates the impact load 24 may be quantified using Eq. 1 above. Without the local energy absorber 20, the peak loads experienced by the impacting object 25 are higher and less energy is absorbed (by the helmet 12") as the impacting object 25 deforms the helmet 12".

As depicted in FIG. 18, a frangible face sheet layer 32 is attached to the energy absorbing core layer 30 facing the head 14". In an example, the local energy absorber 20 may have an adhesive layer 72 disposed between the energy absorbing core layer 30 and the frangible face sheet layer 32 to attach the frangible face sheet layer 32 to the energy absorbing core layer 30 by adhesive bonding. Similarly to the example depicted in FIG. 4, in the example depicted in FIG. 18, the adhesive layer 72 may or may not be included in examples of the local energy absorber 20. Further, similar to other examples of energy absorbers 20 disclosed herein, the energy absorber 20 depicted in FIG. 18 may include struts 89 and a reinforcement sheet layer 34.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 3 ms to about 36 ms should be interpreted to include not only the explicitly recited limits of from about 3 ms to about 36 ms, but also to include individual values, such as 5 ms, 10 ms, 15 ms, etc., and sub-ranges, such as from about 10 ms to about 18 ms; from about 15 ms to about 19.5 ms, etc. Furthermore, when "about" is utilized to describe a value, this is meant to encompass minor variations (up to +/−10 percent) from the stated value.

Further, the terms "connect/connected/connection", forms of "attach" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A cover, removably covering a covered object, comprising:
    an inner surface of the cover facing the covered object and spaced from the covered object, and an outer surface of the cover opposite the inner surface; and
    a local energy absorber operatively attached to the inner surface of the cover, the local energy absorber including:
        an energy absorbing core layer operatively attached to the inner surface of the cover;
        a frangible face sheet layer attached to the energy absorbing core layer facing the covered object, the frangible face sheet layer initiates fracture during an impact applied to the outer surface defining an impact event having a duration of less than 20 milliseconds;
        a reinforcement sheet layer attached to the energy absorbing core layer opposite to the frangible face sheet layer to sandwich the energy absorbing core layer between the frangible face sheet layer and the reinforcement sheet layer; and
        a plurality of struts, each strut attached to the reinforcement sheet layer and to the frangible face sheet layer, wherein the local energy absorber further includes a subset of the plurality of struts that, during the impact event, deforms in a sequence beginning with elastic deformation, followed by buckling, followed by fracture of the subset of the plurality of struts.

2. The cover as defined in claim 1 wherein each of the plurality of struts is located at a perimeter of the local energy absorber.

3. The cover as defined in claim 1 wherein each of the plurality of struts is spaced from a perimeter of the local energy absorber.

4. The cover as defined in claim 1 wherein:
    the energy absorbing core layer includes a 3003 aluminum alloy with a crush strength of about 45 pounds per square inch (psi);
    each strut in the plurality of struts is formed from Magnesium AZ31-O;
    the frangible face sheet layer includes a first Magnesium AZ31-O sheet; and
    the reinforcement sheet layer is formed from a polymer.

5. The cover as defined in claim 1 wherein the frangible face sheet layer defines at least one stress concentrating notch in a surface of the frangible face sheet layer, the at least one stress concentrating notch to be a fracture initiation site on the frangible face sheet layer during the impact event.

6. The cover as defined in claim 1 wherein the frangible face sheet layer defines a perimeter of at least one slot through a thickness of the frangible face sheet layer, the at least one slot to be a fracture initiation site on the frangible face sheet layer during the impact event.

7. The cover as defined in claim 1 wherein:
    the local energy absorber is to contact the covered object during the impact event; and
    the frangible face sheet layer is to dissipate energy by bending and fracturing during the contact with the covered object.

8. The cover as defined in claim 1, further comprising a layer of adhesive disposed between the local energy absorber and the inner surface of the cover to attach the local energy absorber to the inner surface of the cover by adhesive bonding.

9. The cover as defined in claim 1 wherein the local energy absorber further includes an adhesive layer disposed between the energy absorbing core layer and the frangible face sheet layer to attach the frangible face sheet layer to the energy absorbing core layer by adhesive bonding.

10. The cover as defined in claim 1 wherein the cover is a vehicle hood, and the covered object is an underhood object.

11. The cover as defined in claim 1 wherein the cover is a helmet, and the covered object is a head of a wearer of the helmet.

12. A cover, removably covering a covered object, comprising:
an inner surface of the cover facing the covered object and spaced from the covered object, and an outer surface of the cover opposite the inner surface; and
a local energy absorber operatively attached to the inner surface of the cover, the local energy absorber including:
an energy absorbing core layer operatively attached to the inner surface of the cover, the energy absorbing core layer including a matrix of open cells;
a frangible face sheet layer attached to the energy absorbing core layer facing the covered object, the frangible face sheet layer initiates fracture during an impact applied to the outer surface defining an impact event having a duration of less than 20 milliseconds; and
a reinforcement sheet layer attached to the energy absorbing core layer opposite to the frangible face sheet layer to sandwich the energy absorbing core layer between the frangible face sheet layer and the reinforcement sheet layer, wherein each open cell in the matrix of open cells defines a respective hollow tube having a respective longitudinal axis with a respective first open end and a respective second open end and each respective longitudinal axis is perpendicular to the frangible face sheet layer.

13. The cover as defined in claim 12 wherein:
the energy absorbing core layer includes a first core portion having a first crush strength, and a second core portion having a second crush strength at least 10 percent greater than the first crush strength; and
the first core portion is attached to the frangible face sheet;
the second core portion is attached to the frangible face sheet; and
the first core portion is adjacent to the second core portion.

14. The cover as defined in claim 12 wherein the frangible face sheet layer includes a magnesium alloy sheet.

15. The cover as defined in claim 14 wherein the magnesium alloy sheet is formed from Magnesium AZ31-O.

16. The cover as defined in claim 12 wherein the frangible face sheet layer defines at least one stress concentrating notch in a surface of the frangible face sheet layer, the at least one stress concentrating notch to be a fracture initiation site on the frangible face sheet layer during the impact event.

17. The cover as defined in claim 12 wherein the frangible face sheet layer defines a perimeter of at least one slot through a thickness of the frangible face sheet layer, the at least one slot to be a fracture initiation site on the frangible face sheet layer during the impact event.

18. The cover as defined in claim 12 wherein:
the local energy absorber is to contact the covered object during the impact event; and
the frangible face sheet layer is to dissipate energy by bending and fracturing during the contact with the covered object.

19. A cover, removably covering a covered object, comprising:
an inner surface of the cover facing the covered object and spaced from the covered object, and an outer surface of the cover opposite the inner surface; and
a local energy absorber operatively attached to the inner surface of the cover, the local energy absorber including:
an energy absorbing core layer operatively attached to the inner surface of the cover, the energy absorbing core layer including an aluminum alloy honeycomb;
a frangible face sheet layer attached to the energy absorbing core layer facing the covered object, the frangible face sheet layer initiates fracture during an impact applied to the outer surface defining an impact event having a duration of less than 20 milliseconds; and
a reinforcement sheet layer attached to the energy absorbing core layer opposite to the frangible face sheet layer to sandwich the energy absorbing core layer between the frangible face sheet layer and the reinforcement sheet layer, wherein:
a reinforcement sheet seal is formed at a reinforcement interface between the reinforcement sheet layer and the aluminum honeycomb; and
a face sheet seal is formed at a face sheet interface between the frangible face sheet layer and the aluminum alloy honeycomb to prevent water from entering the aluminum alloy honeycomb.

20. The cover as defined in claim 19 wherein the frangible face sheet layer includes a magnesium alloy sheet.

21. The cover as defined in claim 19 wherein the frangible face sheet layer defines at least one stress concentrating notch in a surface of the frangible face sheet layer, the at least one stress concentrating notch to be a fracture initiation site on the frangible face sheet layer during the impact event.

22. The cover as defined in claim 19 wherein the frangible face sheet layer defines a perimeter of at least one slot through a thickness of the frangible face sheet layer, the at least one slot to be a fracture initiation site on the frangible face sheet layer during the impact event.

* * * * *